Oct. 7, 1947.          E. F. FLINT          2,428,662
                      TIMING DEVICE
              Filed Aug. 18, 1943          3 Sheets-Sheet 1

EDWARD F. FLINT
INVENTOR
BY
ATTORNEYS

Oct. 7, 1947.  E. F. FLINT  2,428,662
TIMING DEVICE
Filed Aug. 18, 1943  3 Sheets-Sheet 2

EDWARD F. FLINT
INVENTOR
BY
ATTORNEYS

Oct. 7, 1947.  E. F. FLINT  2,428,662
TIMING DEVICE
Filed Aug. 18, 1943  3 Sheets-Sheet 3

EDWARD F. FLINT
INVENTOR
BY
ATTORNEYS

Patented Oct. 7, 1947

2,428,662

UNITED STATES PATENT OFFICE 2,428,662

TIMING DEVICE

Edward F. Flint, Brighton, N. Y., assignor to Bausch & Lomb Optical Company, Rochester, N. Y., a corporation of New York Application August 18, 1943, Serial No. 499,129

8 Claims. (Cl. 33—70)

This invention relates to measuring instruments and more particularly it has reference to measuring instruments which are combined with timing means. This application is a continuation-in-part of my abandoned copending application Serial No. 446,087, filed June 6, 1942.

Frequently it becomes desirable to determine some single value which will be representative of the separate values of a group of quantitative measurements. Several methods are known for finding a value of this character.

One method frequently used is to divide the sum of the measurements by the number of measurements of the group to find the average. Although devices have been heretofore proposed for determining the average of a group of measurements or the like, they are not suitable in some applications as they are generally intricate and difficult to keep in proper adjustment particularly where the instrument is subject to hard usage.

Another method often used, the median method, is basically designed to ascertain such a representative value for a group composed of an odd number of measurements. The median of the group is obtained by checking off measurements thereof in an ascending or descending order of magnitude until the middle or median measurement is reached. For example, in a group of seven measurements the median value will be the fourth largest measurement of the group.

The device of the present invention is particularly adapted for use with an octant or similar instrument for measuring the angular elevation of celestial bodies for calculations used in navigation to determine the position of the observer relative to the earth's surface. Accurate navigation depends, to a very large extent, on the accuracy with which an observer can determine his position with relation to some known celestial body and to increase the accuracy of the measurement of the angular elevation of the body, an observer will take a series of measurements and through some suitable mechanism determine the average or median value of the series of measurements. Such instruments especially where used with aircraft are subject to hard usage and it has been found that many of the heretofore proposed averaging devices cannot be efficiently used in connection with such instruments.

The device of the present invention comprises a number of movable indicating members of a number sufficient for each to represent a measurement in the group of measurements taken. The members are normally held in a null position but can be very easily released for movement so that they will be moved by actuation of the operating means of the octant and in a direction and at a magnitude dependent on the direction and magnitude of the movement of the operating means. Thus, the relative displacement of the members will indicate the relative magnitude of the measurements taken in the series. Each indicating member carries an index mark which will be visible to the observer and means are provided therein whereby the median of the relatively displaced index marks can be determined with means for translating the relative value of the index mark representative of the median of the measurements into terms of quantity units.

To minimize the errors produced by movement of the body during the time the series of measurements are being made, ordinarily the civil time of the first measurement is noted as well as the last and the time of the series is found by subtracting the time of the first measurement from that of the last. This gives the total time consumed and by dividing the total time by two and adding this result to the time of the first reading, an average civil time is found which can be used as the time of the median reading. The steps of ascertaining the civil time to be used in the calculation for locating position as it increases the amount of calculation as well as the time of compiling the same, also increases the possibility of error. This is extremely dangerous, for an error of four seconds of time results in an error of position of approximately one mile at the equator.

The device of the present invention eliminates the calculations necessary to determine the time to be used, for it provides means for automatically determining the time of the middle one of the series of meaurements. Thus the device of the present invention not only reduces the time of determining position but as it eliminates the step of evaluating the time, also eliminates the possibility of the type of error which the steps introduce in the calculation.

The means of the now-preferred form of the present invention for automatically determining the time of the middle one of the series comprises means for stopping a watch or chronometer fixed to and forming a part of my instrument, when the middle one of the series of measurements has been completed. Thus, in the example previously given, the watch or chronometer is stopped after the fourth measurement is made. As a skilled observer will make each measurement in the series more or less uniformly spaced as to time, the fourth of a series of seven measurements can be considered to have been completed at the time representative of the mean civil time of the series of measurements.

To simplify the device of the present invention and to avoid errors, the means for stopping the watch or chronometer is controlled by the means which seriately releases the movable indicating members for movement with the operating means of the octant.

In the use of the device of the present invention, the watch or chronometer is adjusted so that it accurately reads the time of the day and thereafter the series of measurements can be completed without the necessity of checking the time at which the measurements were commenced for the watch or chronometer will be stopped at the time the middle one of the series of measurements is completed. After the series has been completed, it is only necessary for the observer to determine the median value of the series of measurements and then read directly from the face of the watch or chronometer the time of the middle one of the series of measurements.

Other objects and advantages of the present invention will appear in the following description taken in connection with the accompanying drawing in which.

The device, described herein, for determining the median value of a group of measurements, is also disclosed in my copending application, Serial No. 412,275, filed September 25, 1941. The instant case discloses a timing device as used in connection with the said median device. This application has become Patent No. 2,390,361, issued December 4, 1945.

Figure 1:
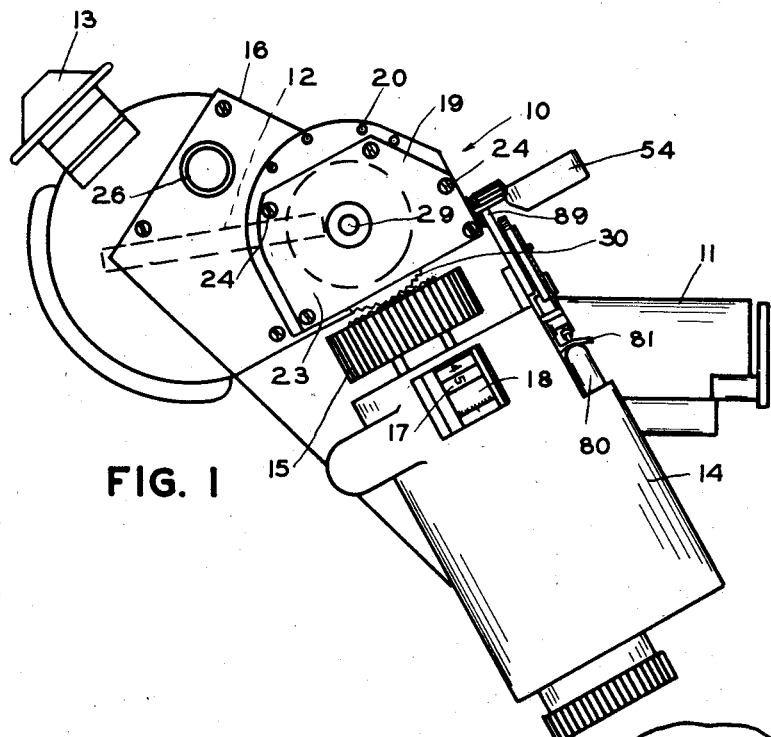
Fig. 1 is a side elevational view of an octant embodying the device of the present invention.

The instrument shown in Fig. 1, which may be either a sextant or an octant, includes the usual body 10, sighting telescope 11, tiltable index reflector 12, and an eyepiece 13. A suitable handle 14 is fixed on the side of the body and a knurled operating wheel 15 is rotatably mounted near one end of the handle. The wheel 15 serves as a drive means for actuating the reflector 12 through a suitable gear train, not shown, but mounted within the housing 16. A registering device 17, mounted on the housing, is also driven by the operating wheel 15 through the gear train, not shown, and is provided with indicating dials visible through a window 18 formed in the handle 14. The registering device is adapted to indicate the angular position of the reflector 12, as adjusted by the operating wheel 15.

Median measurement device

The mechanism forming my median device is mounted within a suitable housing having a body 19, which is secured by screws or other fastening elements 20 to the base of the housing 16. A window 21, of transparent material, forms the front of the housing while its back and open sides are closed, respectively, by plates 22 and 23, screws 24 or other means securing these members to the housing body. A suitable light source indicated at 26 on the housing 16 is used when needed to illuminate the window 21. Energy for this light source may be supplied from a battery, not shown, carried in the handle 14.

Figures 3, 4:
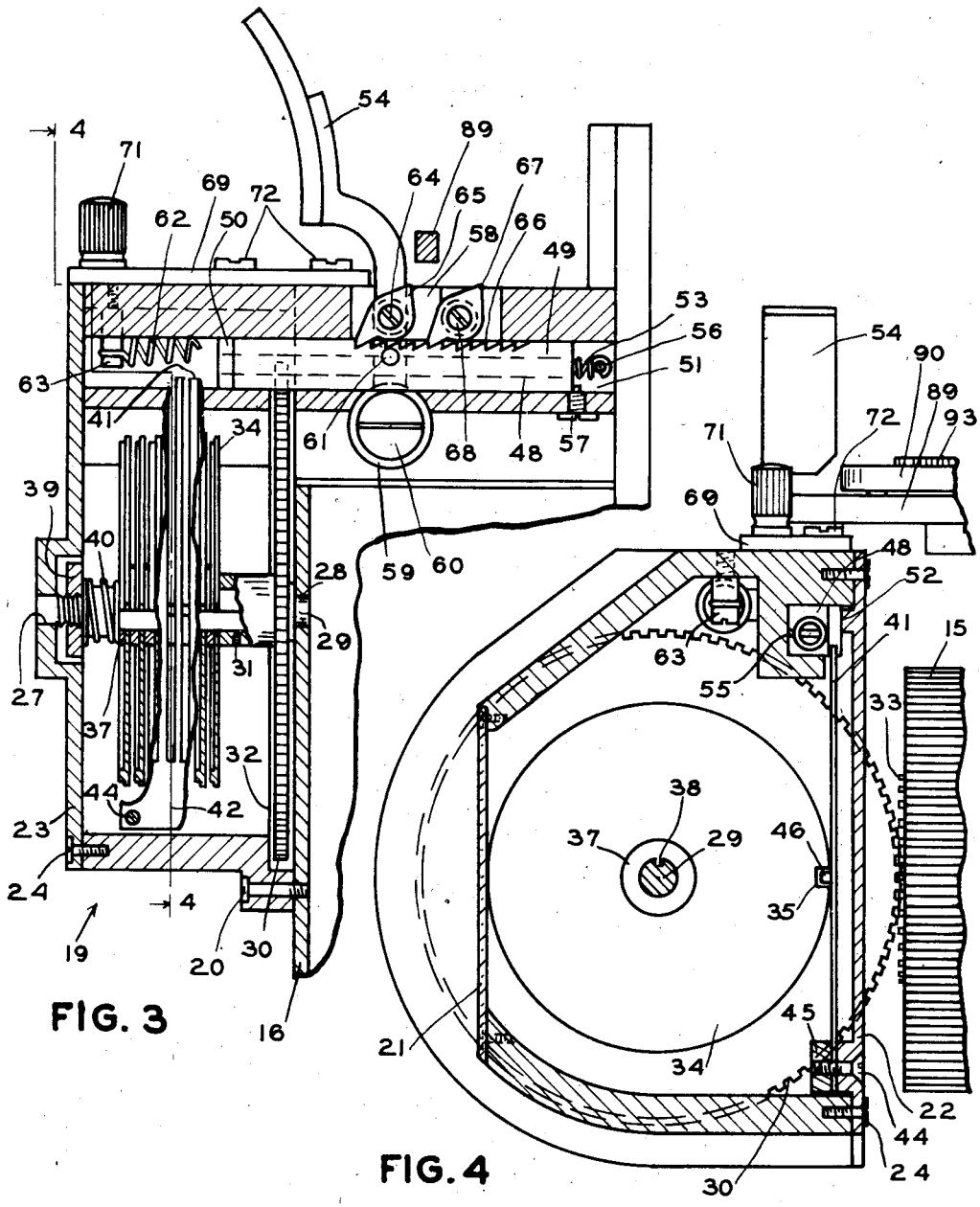
Fig. 3 is a view partly in section and partly in elevation of the median mechanism.
Fig. 4 is a section taken along line 4—4 of Fig. 3.

As may be noted in Fig. 3, the cover plate of the housing 16 and the side plate 23 are provided with aligned bearings 27 and 28 which rotatably support the opposite ends of a shaft 29. A gear 30 is mounted on the shaft 29 for rotation therewith, its hub being secured to the shaft by means of a set screw 31. The gear 30 is of a relatively large radius and extends through a slot 32 provided in the back plate 22. This gear is adapted to mesh with gear 33, provided in any suitable manner upon the operating wheel 15 so that the latter may be utilized to rotate the gear 30 and the shaft 29. It will now be seen that the operating wheel 15 serves as a drive means for the reflector 12, register 17, and shaft 29.

Figure 6:
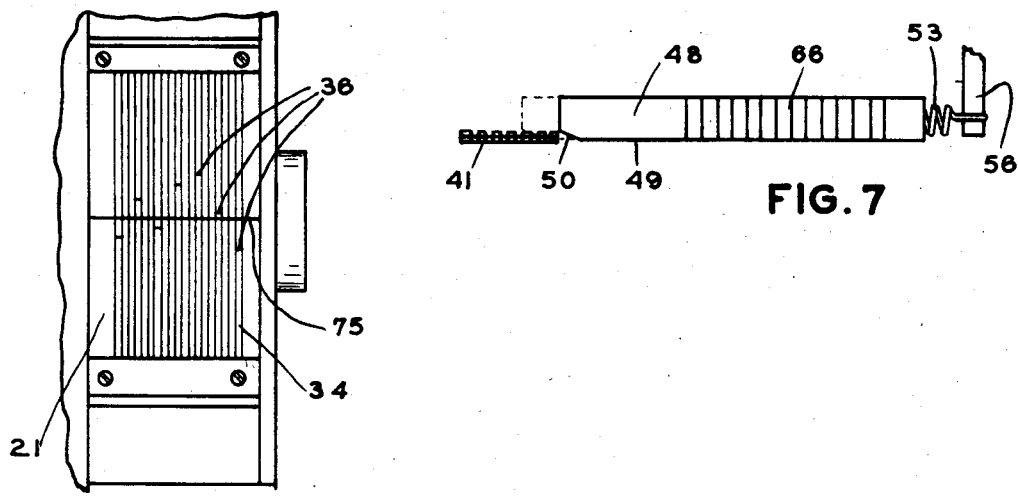
Fig. 6 is a face view looking into the observation window of the median mechanism.

Loosely mounted upon the shaft are a plurality of indicating members or discs 34, each of which, as best shown in Fig. 4, is provided with a notch 35 in its peripheral surface. The peripheral surface of each indicating disc also carries an index mark 36, as best shown in Fig. 6, and which is visible through the window 21. The position of the notch 35, with respect to the index mark 36, is the same for each indicating disc. The number of discs on the shaft is limited only by the practical size of the median device. In keeping with the basis of median determination, I preferably employ an odd number of discs, seven of these indicating discs being illustrated in the drawing.

While discs 34 are loosely mounted on the shaft, they are normally held thereon for rotation therewith by washers 37 carried by the shaft and disposed between the discs. One end washer is employed adjacent to the plate 23, the hub of the gear 30 serving as a washer at the other end of the shaft. Each washer is provided with a lug or projection 38 which cooperates with a longitudinal groove formed in the shaft and serves to key the washers to the shaft. The end of the shaft adjacent to the bearing 27 is threaded and has a nut 39 engaged therewith. A spring 40, mounted on the shaft between the nut and the end washer 37, urges the washers and discs to the right as viewed in Fig. 3. The nut 39 is adjusted until the friction between the washers and the indicating members is sufficient to cause them to rotate with the shaft 29 upon rotation of that member. It is to be noted, however, that the engagement between the shaft and each disc is of such nature that the shaft may be rotated relative to any disc when it is held in a fixed position.

During the operation of the median mechanism there are times when it is necessary that either all or some of the discs 34 be held or locked against rotation with the shaft 29. Although any means may be provided for holding the discs stationary, in the preferred embodiment of the invention as illustrated, this means comprises a spring detent member comprising a plurality of spring fingers 41 formed integral with a base member 42. The base member 42 is secured to the back plate 22 by screws 44 which extend through openings formed therein and engage a clamp block 45 in the manner shown in Fig. 4.

The number of spring fingers should be equal to the number of indicating discs. The fingers are provided with lugs 46 adapted to engage the notches 35 formed in the edges of the discs 34.

The spring detent member is so mounted that the fingers 41 thereof will tend to assume positions which are perpendicular to the longitudinal axis of the operating shaft 29. Under such circumstances each indicating member or disc 34 when positioned as shown in Fig. 4 will have its notch engaged with the lug 46 on its respective detent finger 41.

Figure 7:
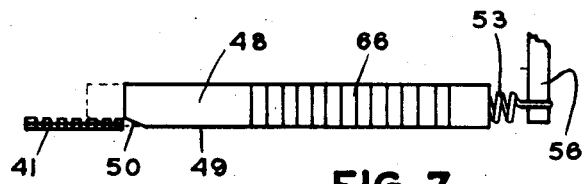
Fig. 7 is a detail plan view of the detent fingers of the median mechanism and the means for moving the fingers out of their normal position.

During the use of the device of the present invention, the indicating discs 34 are adapted to be freed for rotation with the shaft 29 beginning with the inner disc, or that furthest to the right as viewed in Fig. 3 and working outwardly from the body of the instrument or towards the left of Fig. 3 until all of the discs have been freed. This necessitates moving each detent finger out of its engaging position with its disc. In the illustrated embodiment of the present invention, the detent fingers 41 are disengaged by a movable cam means comprising an elongated sliding cam member 48, usually of rectangular cross section, having a side face 49 which provides a cam surface for holding the detent finger out of engagement with the respective disc. The left end of the cam slide 48 as viewed in Fig. 7 is provided with a beveled edge portion 50.

The cam 48 is mounted within a slideway 51 formed in the top of the body of the housing for the median mechanism, one side of the slideway being formed by a projection 52 formed on the back plate 22 of the housing. In Figs. 3 and 4 the detent fingers 41 and the slideway 51 are shown in overlapped relation. Thus, each detent finger 41 will be forced over the bevel 50 and onto the surface 49 as it is contacted by the cam member 48 during movement of the latter. The cam member 48 is so located that its surface 49 will engage a detent finger to hold it in a position wherein its lug 46 is freed from engagement with its coooperating disc 34 and the latter is allowed to rotate with the shaft 29.

Movement of the cam member 48 is controlled by a spring 53 which normally tends to hold the cam surface out of contact with the detent fingers and by suitable means actuated by the handle 54 for moving the cam member 48 against the action of the spring 53. The spring 53 is mounted within a bore which extends through the cam member 48, the one end of the spring being secured to the cam member 48 by a pin 55 and its other end to a post 56 located within the slideway 51. A stop screw 57 which extends through the wall of the slideway 51 by limiting the movement of the sliding cam member causes the spring 53 to be always maintained in tension to constantly urge the cam member away from the detent fingers 41.

Figure 5:
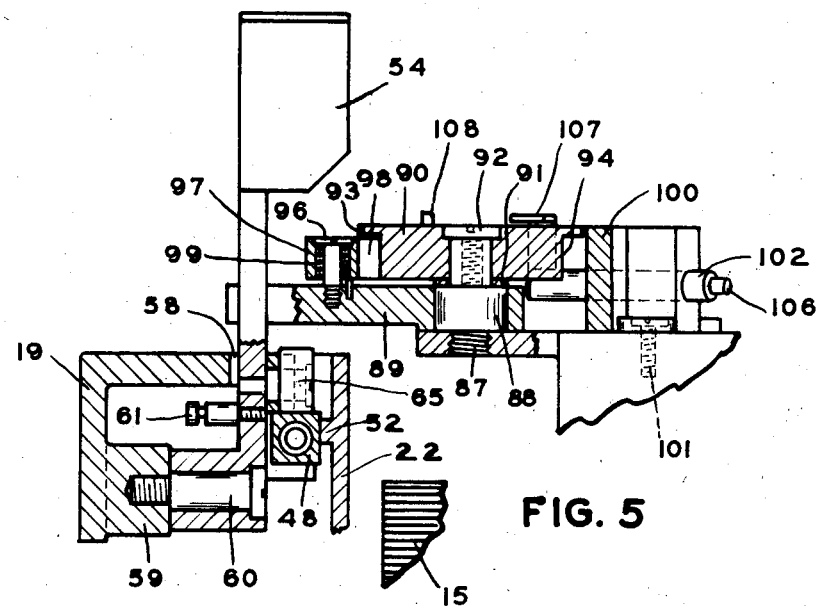
Fig. 5 is a section taken along line 5—5 of Fig. 2.

Movement of the sliding cam member 48 toward the detent fingers 41 is effected by the operating handle 54 which extends through an opening 58 at the top of the body 19 of the housing for the median mechanism. The opening 58 is located to extend through a portion of the housing over the slideway 51 for the cam member 48. The means for mounting the handle 54, as well as the contour of the opening 58, are best observed in Fig. 3 as details of the handle mounting have been omitted from Fig. 4 for the sake of clarity. A boss 59 which depends from the body 19 of the housing is used to support a pivot screw 60 upon which the lower end of the handle is mounted as shown in Figs. 3 and 5.

Near the pivot of the handle there is secured a post 61 to which is connected one end of a spring 62 employed to maintain the handle in an inoperative position. The other end of the spring 62 is attached to post 63 secured to the interior of the housing by any suitable means. Also mounted upon the handle by a screw 64 is a pawl mechanism 65 which is constantly urged by a spring, not shown, into engagement with notches 66 formed on the top surface of the cam member 48. A second pawl 67, similar to that already described, is secured by a screw 68 to the wall of the opening 58 to the right of, or inwardly of the pawl 65, as shown in Fig. 3.

Trip mechanism for disengaging pawls 65 and 67 from the notches 66 includes a slide 69 having a guide slot 70 and an operating knob 71. This trip device is mounted upon the top of the body of the housing 19 by screws 72 which extend through the slot 70 and engage the housing to hold the device in sliding contact therewith. The slide 69 is mounted in such position that upon its inward movement its end will contact pawls 65 and 67 to free them from engagement with the notches 66 and release the cam member 48 for movement under its spring 53. On reverse movement of the sliding trip 69, the pawls will return to their engaging position with the notches 66 due to the already described construction.

Figure 2:
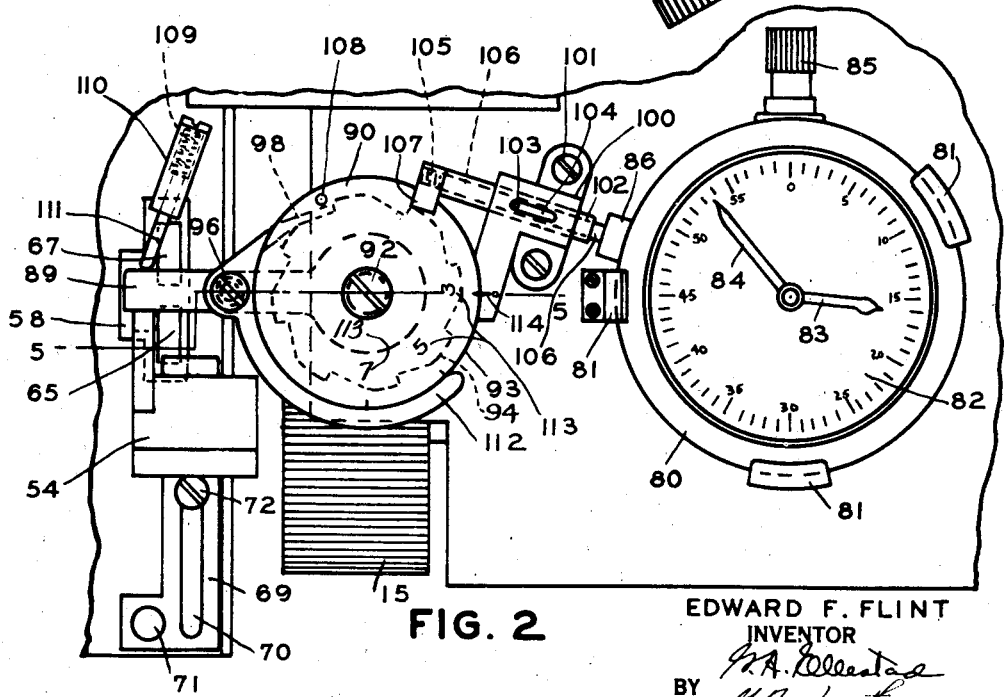
Fig. 2 is an enlarged top plan view of the timing means of the device of the present invention.

Operation of the detent disengaging means may be best understood by reference to Figs. 2 and 3, and it will be seen that clockwise movement of the handle 54 will free pawl 65 from the notch 66 in the cam member 48 with which the pawl is shown engaged and will allow it to engage the next notch to the right as viewed in Fig. 3. During the movement of the pawl 65, the cam member 48 is held against movement to the right by the pawl 67. The spring 62 is strong enough to return the handle 54 to its position shown in Fig. 3 folowing movement of the handle to the right. This return movement of the handle advances the cam member 48 towards the left by a distance of one notch and causes the beveled edge portion 50 of the cam member to contact the end of the detent finger 41 on the right and moves this finger to free its lug 46 from the notch 35 in the right hand or first indicating disc 34. Usually the cam member is so designed and located that each detent finger will ride over the edge portion 50 and onto the flat cam surface 49 for the stroke of the operating handle which frees it from engagement with its indicating member.

Continued actuation of the handle 54 continues to advance the cam member to the left, as just explained. On the completion of the seventh stroke of the handle, all of the seven detent fingers have been released and are being held out of engagement with their respective indicating members, which latter are now permitted to rotate with the shaft 29. It is to be observed that as the cam member is advanced it moves the detent finger to an opposite position in a selected order beginning with the inner or right-hand finger and that as each indicating disc is released it will rotate with the shaft although other indicating members may be still held against rotation.

When the seventh detent finger has been freed, the pawl 67 is engaged in the right-hand notch as viewed in Fig. 3. Although all detent fingers have been freed, no harmful effect will be produced by the continued operation of the handle 54. For example, at the eighth operation of the handle 54, the pawl 65 will cause the cam member to move one notch as heretofore described. In this instance, as there are no notches for the pawl 67 to engage, it will ride on the flat upper surface of the cam member 48 when the handle returns to the left. Obviously, this just described movement will not disturb the detent fingers from their inoperative position as they are still in contact with the relatively long cam surface 49 of the sliding cam member 48.

When it is desired to relock the indicating discs 34, the sliding trip member 69 is moved inwardly or to the right, as viewed in Fig. 3, to move pawls 65 and 67 out of engagement with the notches 66 of the cam member 48. This permits the spring 53 to pull the cam member 48 back to the position shown in Fig. 3 and also releases the detent fingers for engagement with their respective indicating discs. Each detent finger, due to its resiliency, will tend to assume the position as shown in Fig. 4 and will be engaged by its respective indicating member when the notch of the latter is in alignment with the lug of the finger. Rotation of the shaft 29 will still cause unengaged indicating members 34 to be rotated until the notches 35 therein are brought opposite to their respective detents 46 which will then snap into place to hold these indicating members against rotation.

It will thus be seen that through the mechanism just described, the indicating discs can be seriately released for movement with the shaft by successive actuations of the handle 54. In the use of the device of the present invention, where it is used in conjunction with an octant, the observer after sighting the octant on a celestial body actuates the operating handle 15 until the image of the body formed by the optical system of the instrument is brought into coincidence with a datum plane such as will be established by the bubble of a liquid bubble level or the natural horizon, depending on the conditions under which the octant is used. After coincidence has thus been made, he actuates the lever 54 to release the first disc from the right as viewed in Fig. 3 for rotation with the shaft which is driven by the operating knob or handle 15 through the gear train heretofore mentioned. On the next manipulation of the actuating handle 15 to again bring the image of the body into coincidence with the datum plane, the released disc 34 will move with the shaft 29 commensurate with the amount of movement of the operating handle 15 necessary to bring the observed body into coincidence with the datum plane. As the released disc 34 will rotate with the shaft 29 during the second observation, the index mark thereon will be displaced from its initial position by an amount proportional to the movement of the shaft 29 for the second observation. The second reading being completed, the operating handle 15 is again actuated and after coincidence has been obtained, the handle 54 is again actuated to release a second disc 34 for movement with the shaft 29, the handle being actuated immediately following the making of each observation of the series to unlock or release the indicating member corresponding to that observation.

It will be seen now that upon release of the first disc, the index mark 36 thereon will be moved out of alignment with the remainder of the index marks by rotation of the shaft 29 through operation of the handle 15 in completing the second operation. When the second disc is released, the relative position between the index mark 36 of the first disc and that of the second disc is maintained upon rotation of the shaft 29 since both the first and second discs will move or rotate together. In fact, it will now become apparent that any index mark which has been displaced from its initial alignment will, throughout the remaining operation of the median device, maintain its relative displacement with respect to the index mark on the next engaged disc after this disc has been released for rotation with the shaft 29. Thus, the relative displacement between the first and second index marks 36 will remain unchanged from that which exists between the mark after the second observation and while the second index mark was in its initial aligned position. It hence follows that the separation of these marks is a measure of the difference between the first and second observations and that the first index mark may be considered as representing the first observation and the second index mark, the second observation.

As the first disc is not released until after the first observation has been made, there is no necessity for an observer to consult the register and it is immaterial where the register and hence the reflector is set prior to any series of observations.

After the last disc has been released for movement with the shaft 29, any movement of the same will displace all of the discs relative to their initial position of alignment by equal amounts so that the relative positions with respect to each other will remain unchanged. Thus, the displacement between any two index marks, whether they are adjacent or not, will be the measure of the difference in value of the readings which the particular marks represent.

The determination of the median value of the series of measurements, the relative magnitudes of which are represented by the relative positions of the index marks of the discs, is made by merely ascertaining which mark is disposed in the middle of the series of marks. That is, which mark is positioned so that half of the remaining marks are disposed on one side of the same, and the other half on the opposite side. In the device illustrated, as best shown in Fig. 6, seven discs have been shown and the median mark representing the median value of the observation represented by the marks will be the fourth mark in either ascending or descending order. When the median mark has been determined, the actuating handle 15 is moved until the median mark is brought into coincidence with the fiducial line 75 formed on the window 21. As the register 17 is driven by the handle 15, the same will indicate directly the value of the median of the observation in degrees and fractions thereof.

Timing device

As the celestial body observed will have moved relative to the earth during the time the series of seven measurements is being made, and as the time at which the observation or measurement is made is to be used in the calculations for determining the position of the observer, it is necessary to take into account the movement of the celestial body during the period of time elapsed from the first to the final reading of the series of measurements.

The now-preferred embodiment of the invention, comprises a time indicating mechanism such as the stop watch or chronometer 80 which is detachably mounted upon the instrument housing by the spaced clips 81. The watch 80 has the dial 82 over which the hands 83 and 84 move to indicate seconds and minutes, respectively. Although an hour hand has not been shown, if the device is to be used where an ordinary watch, clock or chronometer is not available, an hour hand may be provided. Generally if the instrument is to be used as a navigation instrument for aircraft, the hand can be dispensed with for aircraft equipped to determine position are fitted with chronometers.

That watch is provided with the conventional stem 85 for winding and setting the watch, and the hands of the watch may be selectively stopped by depressing the plunger 86 which projects outwardly from the side of the watch. A watch such as just described may be obtained on the market and so a detailed description of the same will not be given here.

A stud 87, carried by the instrument housing, has a bearing part 88 about which a lever 89 is mounted to turn. A disc 90, separated from the lever 89 by a washer 91, is mounted to rotate about the upper part of the stud 87 and is retained on the latter by a screw 92. The disc 90 has a knurled upper flange portion 93, while the lower part of the same is reduced in diameter and is provided with circumferentially disposed teeth 94. The upper face of disc 90 bears index marks 113 which are arranged to cooperate with the fixed index line 114 carried by block 100. Pivotally mounted on the lever 89 by means of a screw 96 is a yoke 97 which has a pawl portion 98 which is urged against the ratchet formed by the teeth 94 by a spring 99 which is retained by the screw 96. The yoke 97 has an arm 112 by means of which the pawl 98 may be disengaged from the ratchet teeth 94. The block 100 secured to the instrument housing by screws 101 has an opening in which is mounted a tube 102 carrying a pin 103 which cooperates with the slot 104 to prevent rotation of the tube 102. Mounted within tube 102 and adjustably secured thereto by the threaded portion 105 is the rod 106 having an end projecting beyond the tube 102 and engaging the plunger 86 of the watch 80. Fixedly secured to the tube 102 is the finger 107 which is adapted to be engaged by the upstanding pin 108 carried by the disc 90. The usual spring, which has not been shown in the drawing, keeps the plunger 86 normally projecting outwardly so that the tube 102 and the finger 107 normally occupy the position shown in Fig. 2.

It will now be seen that actuation of the lever 54 of the median device to release an indicating disc 34 will move the lever 89 and with it the yoke 97 and that this movement of the latter will cause the pawl 98 to bear against the ratchet 94 and so cause a partial rotation of the disc 90.

To return the lever 89 to its normal position adjacent to the lever 54 of the median device, a spring 109 carried by a small tubular casing 110 acts against one end of a small plunger 111 and urges the other end thereof into engagement with the lever 89 to normally urge the lever in a direction opposite to that in which the lever is moved by actuation of the lever 54 of the median device. Thus, when the lever 89 is released, the spring pressed plunger 111 will return the lever 89 and yoke 97 to the normal position shown in Fig. 2 and the spring 99 will keep the pawl 98 in contact with the ratchet teeth 94.

In operation, the pawl 98 is released by pressing the arm 112 of the yoke 97 so that the disc 90 may be rotated by the knurled edge 93 so as to set the desired index mark 113, engraved on the upper face of the disc 90, opposite the index line 114 carried by the block 100. Thus, if it is desired to make a series of seven measurements, the index number "7" is set opposite the index line 114. As the lever of the median device is actuated for each measurement, the disc 90 is turned step by step and at the fourth movement of the disc 90, the pin 108 will engage the finger 107 and move the tube 102 so that the rod 106 presses on the plunger 86 and stops the movement of the hand of the watch 80. The latter will thus indicate the time of the middle one of the series of seven measurements since the fourth is the middle one of a series of seven measurements.

While the present preferred embodiment of the invention has been illustrated and described herein, it is to be understood that the invention is not limited thereby but is susceptible of changes in form and detail within the scope of the appended claims.

I claim:

1. A device for indicating the median of the times of occurrence of a series of events, comprising a time indicating device; means for controlling said time indicating device; means for actuating said controlling means; movable means adapted to be moved at the occurrence of each event in said series; and means operatively interconnecting said movable means and said actuating means whereby movement of said movable means at the occurrence of the middle event of said series causes said actuating means to actuate said control means thereby stopping said time indicating device.

2. In a device of the type described for determining the median value of a group of quantitative measurements, comprising operating means movable for making such measurements; a plurality of movable indicating members; means for seriately moving said indicating members by and in accordance with movement of the operating means for each measurement; time indicating means; means actuated by said moving means for stopping said time indicating means when a predetermined number of measurements of the series have been made; and means for determining the median value of the measurements from the relative positions of said indicating members.

3. A device for determining the median value of a series of measurements and the time at which the middle measurement of said series was made, comprising operating means movable for making said measurements; a plurality of movable indicating members; means for locking said indicating members against movement; means for seriately releasing said indicating members at each actuation of said operating means; means connecting said operating means and said members whereby actuation of the operating means will move the indicating members as released independently in accordance with the movement of successive actuations of the operating means; time indicating means; means actuated by said releasing means for stopping said time indicating means when the middle measurement of the series of measurements has been completed, whereby said time indicating means will indicate the time at which the middle measurement of said series of measurements was made; and means for determining the median value of the measurements indicated by the relative positions of the indicating members.

4. A device for determining the median value of a group of quantitative measurements and the time at which the middle measurement of said group was made, comprising operating means movable for making said measurements; movable indicating means; means for seriately moving each of said indicating means independently by and in accordance with movement of said operating means for each measurement; time indicating means; means actuated by said moving means for stopping said time indicating means when the middle measurement of the group of measurements has been completed whereby said time indicating means will indicate the time at which the middle measurement of the group was made; and means for determining the median value of the measurements indicated by the relative positions of said indicating means with respect to each other.

5. A device for determining the median value of a group of measurements and the time at which the middle measurement of the group was made, comprising operating means movable for making said measurements; a plurality of movable indicating members normally held against movement; means for seriately releasing said indicating members at each actuation of said operating means; means operatively connecting said operating means and said members whereby actuation of the operating means will move the indicating members as released independently in accordance with the movement of successive actuations of the operating means; time indicating means; means actuated by said releasing means for stopping said time indicating means when the middle measurement of the group of measurements has been completed; and means for determining the median value of the measurements indicated by the relative positions of the indicating members.

6. A measuring instrument comprising a member movable for making each measurement of a series, a time indicator, and means actuated by said member for controlling the time indicator to stop it at the midpoint of the series of measurements.

7. A device for indicating the median of the times of occurrence of a series of an odd number of successive measurements comprising a member movable for making each measurement of the series, a time indicator, and means actuated by the member for stopping the time indicator when the middle measurement of the series is made.

8. A device for indicating the median of the times of occurrence of a series of an odd number of successive events comprising a time indicator, a member adapted to be moved at the occurrence of each event of the series, and control means operatively connected to said member for stopping the time indicator when the middle event of the series occurs.

EDWARD F. FLINT.

REFERENCES CITED

The following references are of record in the file of this patent:

UNITED STATES PATENTS

| Number | Name | Date |
|---|---|---|
| 2,337,045 | Holt | Dec. 21, 1943 |
| 1,412,574 | Richard | Apr. 11, 1922 |